(12) United States Patent  
Rieger et al.

(10) Patent No.: US 9,579,596 B2  
(45) Date of Patent: Feb. 28, 2017

(54) AIR FILTER ELEMENT HAVING A SPECIFIC RETAINING GEOMETRY

(71) Applicant: MANN+HUMMEL GMBH, Ludwigsburg (DE)

(72) Inventors: Mario Rieger, Ludwigsburg (DE); Werner Blossey, Benningen (DE); Pascal Neef, Renningen (DE); Gelase Mbadinga Mouanda, Bietigheim-Bissingen (DE); Sven Epli, Heilbronn (DE); Franziska Schulz, Schifferstadt (DE); Martin Schmid, Reisbach (DE); Alfons-Alois Schwinghammer, Dingolfing (DE); Joachim-Paul Krieger, Reisbach (DE); Michael Kolmeder, Dingolfing (DE)

(73) Assignee: MANN+HUMMEL GMBH, Ludwigshafen (DE)

( * ) Notice: Subject to any disclaimer, the term of this patent is extended or adjusted under 35 U.S.C. 154(b) by 100 days.

(21) Appl. No.: 14/330,919

(22) Filed: Jul. 14, 2014

(65) Prior Publication Data

US 2014/0318090 A1   Oct. 30, 2014

Related U.S. Application Data

(63) Continuation of application No. PCT/EP2013/050574, filed on Jan. 14, 2013.

(30) Foreign Application Priority Data

Jan. 13, 2012   (DE) .................. 10 2012 000 469

(51) Int. Cl.
  *B01D 46/00*   (2006.01)
  *B01D 46/10*   (2006.01)
  (Continued)

(52) U.S. Cl.
  CPC ..... *B01D 46/0002* (2013.01); *B01D 46/0001* (2013.01); *B01D 46/0005* (2013.01); (Continued)

(58) Field of Classification Search
  CPC   B01D 46/0001; B01D 46/0005; B01D 46/10; B01D 2271/02; B01D 2271/022; (Continued)

(56) References Cited

U.S. PATENT DOCUMENTS 5,888,442 A    3/1999  Kometani et al.
6,293,984 B1 * 9/2001  Oda .................. B01D 46/10
                                              55/497

(Continued)

FOREIGN PATENT DOCUMENTS

DE   WO 2012175438 A1 * 12/2012 ............. B01D 46/10
WO        2010092003 A2    8/2010
WO        2010114906 A1   10/2010

*Primary Examiner* — Robert Clemente
(74) *Attorney, Agent, or Firm* — James Hasselbeck

(57) ABSTRACT

Disclosed is an air filter element (200) for insertion into an air filter housing, comprising an intake surface (275), a discharge surface (285), a filter medium (210), and a filter element-retaining device (240) which extends along at least a section of the periphery of the filter medium (210), between the intake surface (275) and the discharge surface (285), and which includes a retaining arrangement (270) that radially projects from the filter medium (210).

14 Claims, 12 Drawing Sheets

(51) Int. Cl.
*B01D 46/52* (2006.01)
*F02M 35/02* (2006.01)
*F02M 35/024* (2006.01)

(52) U.S. Cl.
CPC ........... *B01D 46/10* (2013.01); *B01D 46/521* (2013.01); *F02M 35/0203* (2013.01); *F02M 35/0245* (2013.01); *F02M 35/02491* (2013.01); *B01D 2265/026* (2013.01); *B01D 2271/02* (2013.01); *B01D 2271/022* (2013.01); *B01D 2279/60* (2013.01)

(58) Field of Classification Search
CPC ............ B01D 46/521; B01D 2265/026; B01D 2279/60; F02M 35/0203; F02M 35/02416; F02M 35/02491
See application file for complete search history.

(56) References Cited

U.S. PATENT DOCUMENTS

| | | | |
|---|---|---|---|
| 7,070,641 B1 | 7/2006 | Gunderson | |
| 2002/0124734 A1 | 9/2002 | Spannbauer | |
| 2003/0217534 A1* | 11/2003 | Krisko | B01D 45/12 55/337 |
| 2014/0260143 A1* | 9/2014 | Kaiser | B01D 46/10 55/501 |

* cited by examiner

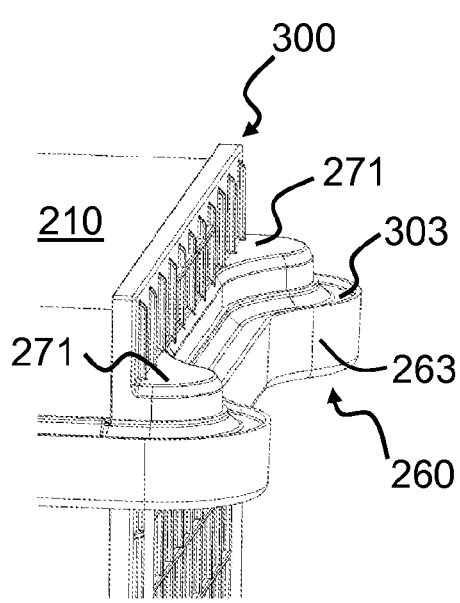
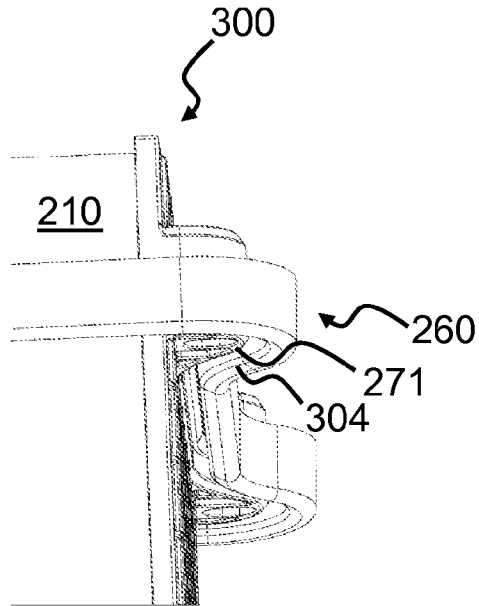
Fig. 11  Fig. 12
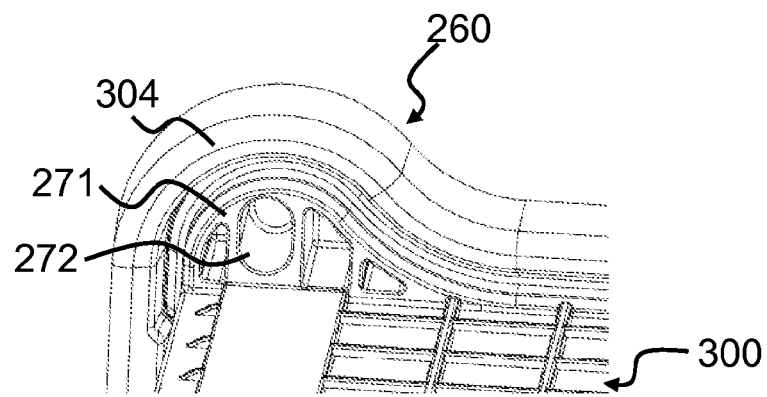
Fig. 13

AIR FILTER ELEMENT HAVING A SPECIFIC RETAINING GEOMETRY

CROSS-REFERENCE TO RELATED APPLICATIONS

This application is a bypass continuation application of international application No. PCT/EP2013/050574 having an international filing date of Jan. 14, 2013 and designating the United States, the international application claiming a priority date of Jan. 13, 2012, based on prior filed German patent application No. 10 2012 000 469.9, the entire contents of the aforesaid international application and the aforesaid German patent application being incorporated herein by reference.

FIELD OF THE INVENTION

The present invention relates to a filter element, in particular an air filter element, for example for air filtration in motor vehicles, agricultural or construction machinery, having a retaining geometry which allows a secure and space-saving arrangement of a filter element in an air filter housing.

BACKGROUND OF THE INVENTION

Normally, air filters consist of an air filter housing and a replaceable filter element. The filter element can be replaced when it is dust-laden after a certain operating period and filter performance is decreasing. The operator normally replaces the filter element. In order to achieve an optimal filtering effect, it is necessary for the filter elements in the air filter housing to be arranged reliably and in an exact position to thereby facilitate optimal flow geometry and moreover obtain a reliable seal between a raw air side and a clean air side. Because replacement must frequently be carried out by less qualified personnel, a design of the filter element and filter housing is necessary that substantially prevents incorrect placement. For this purpose, filter elements are provided with retaining devices that make it possible to insert and position the filter element inside the air filter housing so that reliable operation of the air filter is facilitated. These types of filter elements are known for example from WO 2010/099317, which describes a filter element which can be inserted into an air filter housing.

SUMMARY OF THE INVENTION

An object of the invention can be regarded as making available a filter element, an air filter housing and an air filter, which allow an operationally safe positioning of a filter element in an air filter housing.

The object of the present invention is attained by the subject matter of the independent claims; additional embodiments are embodied in the dependent claims.

According to the invention, an air filter element is made available for insertion into an air filter housing, wherein the air filter element comprises an intake surface, a discharge surface, a filter medium and a filter element-retaining device. The filter medium extends between the intake surface and the discharge surface in an axial direction of the air filter element. The filter element-retaining device is connected to the filter medium, wherein the filter element-retaining device extends along at least a section of the periphery of the filter medium between the intake surface and the discharge surface. The filter element-retaining device includes a retaining arrangement that radially projects from the filter medium.

In this way, air filter element is made available which permits a safe and reliable installation in an air filter housing. In particular the radially projecting retaining arrangement makes possible a positioning of the air filter element in the housing, in particular an axial positioning. The retaining arrangement can be designed in sections or even circumferentially. Parts of the filter element-retaining device can also project axially over the discharge or intake surface. For example, the retaining arrangement can project laterally over the intake or discharge surface, but also be fastened solely on a lateral surface of the filter medium. The retaining arrangement is preferably disposed axially between the discharge and intake surfaces.

According to a further embodiment of the invention, the retaining arrangement comprises a radially projecting convexity. The retaining arrangement preferably comprises a plurality of radially projecting convexities.

According to an exemplary embodiment of the invention, the filter element-retaining device comprises a sealing arrangement with a sealing line surrounding the filter medium, which due to an interaction with e.g., an air filter housing is suitable for axially and/or radially sealing of a raw side (unfiltered air) from a clean side (filtered air).

According to an exemplary embodiment of the invention, an air filter element for insertion in an air filter housing is made available, wherein the filter element-retaining device comprises a retaining arrangement radially projecting from the filter medium along with a sealing arrangement with a sealing line surrounding the filter medium. The radially projecting retaining arrangement is situated between the surrounding sealing line and the filter medium. In this way, the air filter element can be designed in a compact manner, in particular because further elements no longer have to be disposed outside the sealing line.

According to an exemplary embodiment of the invention, the filter medium comprises between the intake surface and the discharge surface at least one edge, on which a first filter medium lateral surface and a second filter medium later surface abut. The filter element-retaining device comprises a radial convexity on the edge, wherein the sealing arrangement comprises a sealing line surrounding the filter medium. The sealing line runs along the radial convexity, wherein the radius R2 along the progression of the sealing line is preferably greater than the radius R1 of the edge. In other words, the sealing line runs over the radial convexity.

In this way, a sealing progression having a large radius as compared with the edge radius of a housing inner edge can be made available. This permits a simplified application of a sealing compound, or the receiving of a filter element that has been provided with a sealing compound. The radial convexity can extend thereby substantially only over one of the lateral surfaces of the filter housing. Alternatively, the radial convexity can also extend beyond two adjacent lateral surfaces of the filter housing, in particular to the same degree.

According to an exemplary embodiment of the invention, the retaining arrangement comprises at least one recess in the axial direction, wherein the recess is designed to receive a projection located on the air filter housing side. This makes it possible to precisely position the air filter element in the air filter housing. In particular, the recess makes it possible to check for proper insertion of the filter element in the housing. If the recess of the air filter element is engaged with the projection of the housing, the correct installation position has been obtained. If the recess and the projection are not engaged, this is immediately apparent so that even untrained personnel are aware that the installation position is not correct. The recess can be a through hole or a blind hole. The hole can have a circular cross section, but also an oval, elliptical or rectangular cross section.

Instead of projections on the housing and recesses on the filter element, projections can also be provided partially or wholly on the filter element and recesses on filter housing.

According to an exemplary embodiment of the invention, the cross section of the recess decreases at least partially in the axial direction. In particular, the recess tapers in the axial direction at least partially conically. In this way, a centering of the air filter element in the housing can be carried out. Moreover, the installation is simplified considerably, because the conical shape requires a lower level of accuracy in getting the projection and recess together. The conical taper can be in the shape of a cone, truncated cone or even a pyramid or truncated pyramid. However, the conical taper is not restricted to a linear taper, but can also have a curved taper for instance in the shape of a paraboloid stub or an ellipsoid stump.

According to an exemplary embodiment of the invention, at least one of the recesses is an elongated hole recess. In this way, it is possible to achieve a tolerance-related determination with respect to one direction. This makes a shock or vibrational swing compensation or a temperature equalization possible. In addition, an elongated hole can also compensate for a distorted air filter housing to a certain degree. Despite the tolerance on the elongated hole, the combination of a conventional hole and an elongated hole permits precise positional fixing at the conventional hole. The combination of a conventional hole with a first elongated hole and a second elongated hole transverse thereto can also be provided. The plurality of holes can be distributed over different locations on the air filter element.

According to an exemplary embodiment of the invention, the retaining arrangement comprises a plurality of recesses in the axial direction, which are disposed along the periphery of the filter element-retaining device in such a way that the recesses are distributed over an angle of at least 90 degrees. In this way, it is possible to ensure that the filter element according to the invention, which is provided for an axial installation, is not replaced inadvertently with a filter element for a radial installation. This increases the operational reliability of the air filter.

According to an exemplary embodiment of the invention, the retaining arrangement comprises a plurality of recesses in the axial direction, wherein the plurality of recesses related to a central axis of the air filter element comprises an angular division which defines a unique installation position of the air filter element in an air filter housing. This makes it possible to ensure that the in fact correctly selected filter element is not incorrectly positioned in the air filter housing.

Alternatively or additionally, the arrangement and/or the configuration of the recesses can also serve as a coding, i.e., installing a filter element that is largely structurally identical but nevertheless incorrect is thereby prevented.

To be understood as an angular division in this case is the angle spanning two recesses with respect to a central axis. If the angles between different pairs of recesses differ, then an incorrect rotational positioning of the air filter element in a filter housing is not possible in the case of an appropriate selection of an angular division. It is also understood that this positional definition can also be achieved by a non-symmetrical arrangement of different recesses, which do not fit together with corresponding projections in the filter housing. Instead of projections on the housing and recesses on the filter element, projections can also be provided partially or wholly on the filter element and recesses on filter housing.

According to an exemplary embodiment of the invention, the filter element-retaining device comprises a sealing arrangement with a sealing line surrounding the filter medium, wherein the recesses are disposed at least partially between the surrounding sealing line and the filter medium.

This makes it possible to dispose the recesses within a seal barrier. In this case, a blind-hole-shaped recess can be meaningful, which does not produce a passage between the raw air side and the clean air side, rather these regions are kept separate from each other. In addition, the outer dimension of the filter element can be kept small, because a recess no longer has to be provided outside the sealing line.

According to an exemplary embodiment of the invention, the recesses disposed between the surrounding sealing line and the filter medium are closed recesses. In this way, the raw air side can be kept separate from the clean air side.

According to an exemplary embodiment of the invention, the sealing arrangement comprises an elastic sealing material, wherein the sealing line rests on the sealing material. This makes it possible to achieve a reliable seal, which is adapted to the gap being sealed. Providing a seal on the filter element guarantees that a sensitive component of a seal is replaced every time a filter element is changed and a new seal is always used. Otherwise, a spare seal must always be available for the case that a housing-side seal is defective.

According to an exemplary embodiment of the invention, the retaining arrangement comprises a retaining surface, which is designed to transfer retention forces between the air filter element and an air filter housing, wherein the retaining surface is disposed between the surrounding sealing line and the filter medium. In this way, an axial positioning of the sealing element is ensured. The positioning within the seal furthermore limits the construction dimensions of the filter element, because no further surfaces must be provided radially outside the seal.

The retaining surface is preferably disposed in an axially offset manner with respect to a sealing surface facing in the same direction, which sealing surface is formed by the sealing arrangement on the filter element side. For example, the advantage of a retaining surface that is set axially forward is that the axial offset can prevent the sealing compound from reaching the retaining surface when the sealing arrangement is being formed on the retaining arrangement. In addition, it is advantageous in terms of production if the corresponding retaining surface and sealing surface are disposed at the same height on the sides of the filter housing. Because the retaining surface on the filter element side is set back axially with respect to the sealing surface facing in the same direction, a defined compression of the seal is guaranteed.

A further development of the invention features an especially operationally secure holding of the air filter element in the filter housing, in which the retaining arrangement comprises on opposing sides a respective retaining surface disposed between the sealing line and the filter medium. The retaining surfaces are consequently facing in opposite directions and designed in turn for contact on retaining surfaces located on the filter housing side. The filter element can be held operationally secure and in a precise position in both axial directions.

According to an exemplary embodiment of the invention, the progression of the sealing line is curved radially away from the filter medium in sections. The curvature away

[from the filter medium] in sections constitutes a sealing line that is laterally concave in terms of the filter element in the viewing direction. This type of concavity makes the positioning of further structural elements possible, for instance a reinforcing rib, a strut, a screw joint or the like.

An exemplary embodiment of the invention features an especially uniform progression, in which the sealing line runs in a manner that is radially curved away from the filter medium along a plurality of sections, wherein each curved away section is assigned a section, in which the sealing line runs radially curved toward the filter medium. A structural compact filter element is produced, if the sections assigned to each other directly follow one another in the circumferential direction of the air filter element.

The sealing line preferably runs in one or a plurality of sections with at least almost a constant radius of curvature curved radially away from the filter medium and/or the sealing line runs in one or a plurality of sections with at least an almost constant radius of curvature curved toward the filter medium. The curved sections are consequently like segments of a circle. As a result, for example, the programming of the travel path of a metering robot along the curved sections is simplified in the manufacturing of the sealing arrangement.

Alternatively or additionally, the sealing line can comprises at least one curved section, which is configured to be in the shape of a segment of an ellipse, a segment of a parabola or a segment of a hyperbola. It can likewise be advantageous if, at least at the transition between a straight and a curved section, the change in the radius of curvature is configured in reliance on a continuous function. This preferably applies to the change in the radius of curvature along the at least largely entire sealing line.

A further development of the invention features a space-saving structural shape, in which the sealing line is curved radially away from the filter medium along a section, is straight along a section and is again curved radially away from the filter medium along a section, wherein the three sections follow in succession, particularly in direct succession, in the circumferential direction of the air filter element. Thanks to this measure, a type of concavity is produced in the region of the straight section, in which e.g., housing-side fastening means can be disposed.

According to an exemplary embodiment of the invention, the retaining arrangement extends in the axial direction along the filter medium over at least a portion of the filter medium, wherein the portion extending in the axial direction is designed as a spacer from an air filter housing. This makes it possible for the retaining arrangement to also be used at the same time as a spacer in order to support the filter element laterally in the air filter housing. This stabilizes in particular axially elongated filter elements in the filter housing. The axial extension can be connected uniformly to the retaining arrangement or even be connected together from several parts. The axially elongated parts can be rigid or flexible or elastic. The axial extension can comprise a tapering end on a side facing away from the retaining surface in the direction of the filter medium in order to facilitate an introduction of the filter element into the air filter housing.

According to an exemplary embodiment of the invention, the sealing arrangement is designed for an insertion of the air filter element into an air filter housing along an axial direction. This makes is possible for the filter housing to be provided with a fully enclosed housing body with an axial opening, through which the filter element can be inserted axially. The housing body can then be sealed with a corresponding cover. Because of the surrounding seal, a good sealing effect can be anticipated with an axial seal.

According to an exemplary embodiment of the invention, the radial convexity extends substantially only over one of outer edges of the filter element-retaining device.

In this way, the filter element can be minimized in one direction in terms of the outer dimensions. In particular, the convexity does not project over the adjacent outer edge. Because the convexity only projects over one edge, it is possible for the construction dimensions of the filter element to be reduced with respect to the non-projecting edge. In the case of a plurality of convexities on a filter element, the convexities can project only over two opposing sides of the filter element receptacle, but not over the two other opposing sides. In particular, four convexities can be provided, two of which are provided respectively on each of the two opposing sides, in particular near to or directly at the axial edges of a filter element.

According to an exemplary embodiment of the invention, the radial convexity projects beyond the first lateral surface and the second lateral surface to approximately the same degree.

In this way, the required overhang length of the convexity can be reduced. Whereas, in the case of projecting over only one lateral surface and a predetermined minimum radius R2, the overhang length is at least the length of the radius R2, in the case of uniformly projecting over two adjacent lateral surfaces, which are at a 90 degree angle to one another, with the same minimum radius R2, the overhang length can be reduced to approx. 0.3*R2, without having to reduce the minimum radius R2.

According to an exemplary embodiment of the invention, the sealing arrangement comprises an elastic sealing material surrounding the filter medium, wherein the sealing material runs along or via the convexity. This makes it possible to apply the to-be-applied sealing material easily, simply and quickly along the planned sealing line.

According to an exemplary embodiment of the invention, the filter medium comprises four filter medium lateral surfaces and the filter medium lateral surfaces and the intake surface and the discharge surface preferably run perpendicular to each other. This yields a rectangular filter medium that is simple to manufacture.

According to an exemplary embodiment of the invention, an air filter housing is made available, which is designed to receive the filter described above. The air filter housing comprises an intake opening, a discharge opening and a filter element receptacle, wherein the filter element receptacle is situated between the intake opening and the discharge opening. The filter element receptacle comprises a convexity pointed radially away from the filter element to be inserted and a surrounding sealing arrangement, wherein the sealing arrangement comprises a surrounding sealing line. The sealing line runs in the radial convexity, wherein the radius along the progression of the sealing line is greater than the radius of a housing inner edge of the air filter housing situated at the convexity.

According to an exemplary embodiment of the invention, the filter element receptacle comprises a retaining surface, wherein the retaining surface is located between the surrounding sealing line and the filter element to be inserted.

In this way, no additional retaining surface must be made available outside the sealing arrangement so that the dimensions of the filter element can be kept small.

According to an exemplary embodiment of the invention, an air filter housing is made available, which is designed to receive the filter element described above. The air filter housing comprises an intake opening, a discharge opening and a filter element receptacle. The filter element receptacle is situated between the intake opening and the discharge opening. In particular the filter element receptacle comprises at least one projection in the axial direction of the filter element, wherein the projection is designed to engage in a recess on the filter element side.

In this way, a filter housing is made available, which corresponds with the filter element described above. In particular, the projections and the recesses can be coordinated with one another.

According to an exemplary embodiment of the invention, an air filter housing is made available, which is designed to receive the filter element described above, wherein the air filter housing comprises an intake opening, a discharge opening and a filter element receptacle. The filter element receptacle is situated between the intake opening and the discharge opening, wherein the filter element receptacle comprises a retaining surface and a sealing arrangement with a sealing line surrounding the air filter housing, wherein the retaining surface is disposed between the surrounding sealing line and the filter element to be inserted. This makes a compact design of the air filter housing possible, in particular, because other elements no longer have to be disposed outside the sealing line.

According to an exemplary embodiment of the invention, an air filter housing is made available, which is designed to receive the filter element described above, wherein the air filter housing comprises an intake opening, a discharge opening and a filter element receptacle. The filter element receptacle is situated between the intake opening and the discharge opening, wherein the filter element receptacle comprises a convexity pointed radially away from a filter element to be inserted and a surrounding sealing arrangement, wherein the sealing arrangement comprises a surrounding sealing line. The sealing line runs in the radial convexity, wherein the radius $R2$ along the progression of the sealing line is greater than the radius $R1$ of a housing inner edge of the air filter housing situated at the convexity.

In this way, a compact design of an air filter housing can be made available with a sealing line having a radius that is large as compared to a radius of a housing inner edge and that is favorable for fabrication. Such an air filter housing is suitable in particular to correspondingly receive a filter element described above with an analogous sealing arrangement.

According to an exemplary embodiment of the invention, the air filter housing comprises a surrounding sealing line, wherein the progression of the sealing line is curved radially away from a to-be-inserted filter element in sections.

In this way, a sealing geometry can be provided on the filter housing, which can provide a space for instance for screw joints, bracings or other elements in the corresponding convexities of the radially curved away sections of the sealing line.

According to an exemplary embodiment of the invention, the filter element receptacle comprises at least one projection in the axial direction of the filter element, wherein the projection is designed to engage in a recess on the filter element side.

In this way, filter housing is made available, which corresponds to the filter element described above. In particular, the projections and the recesses can be coordinated with each other.

According to an exemplary embodiment of the invention, the filter element receptacle comprises a convexity pointing radially away from the filter element to be inserted, wherein the sealing line runs in the convexity, wherein the radius along the progression of the sealing line is greater than the radius of a housing inner edge of the air filter housing situated at the convexity.

In this way, a sealing progression having a large radius as compared with the edge radius of a housing inner edge can be made available. This permits the simplified application of a sealing compound, or the receiving of a filter element that has been provided with a sealing compound. The radial convexity can extend thereby substantially only over one of the lateral surfaces of the filter housing. Alternatively, the radial convexity can also extend beyond two adjacent lateral surfaces of the filter housing, in particular to the same degree.

According to an exemplary embodiment of the invention, an air filter with an aforementioned air filter element and an aforementioned air filter housing can be made available, wherein the air filter element is disposed replaceably in the filter element receptacle of the air filter housing. Because of the replaceability, it is possible to ensure the filter performance of the air filter by replacing of the filter element.

The air filter element and the air filter, as described above and in the following, are used in particular for air filtration in motor vehicles, construction or agricultural machinery. They are used especially for filtration of the intake air of an internal combustion engine or for filtration of the supply air of a vehicle passenger compartment. But they can also be configured in a modified manner such that that they are used for other fluids, in particular also liquids and liquid mixtures. They can especially be largely structurally identical, but also be configured as fuel or oil filter elements for motor vehicles or as fuel or oil filters for motor vehicles.

The individual features can naturally also be combined among one another, whereby to some extent advantageous effects can arise that surpass the total of the individual effects.

This and other aspects of the present are explained and illustrated making reference to the exemplary embodiments described below.

BRIEF DESCRIPTION OF THE FIGURES

Exemplary embodiments are described in the following making reference to the following drawings.

FIGS. 11 to 13 show different partial views of a filter element according to an exemplary embodiment of the invention;

DETAILED DESCRIPTION OF EXEMPLARY EMBODIMENTS

Figure 1:
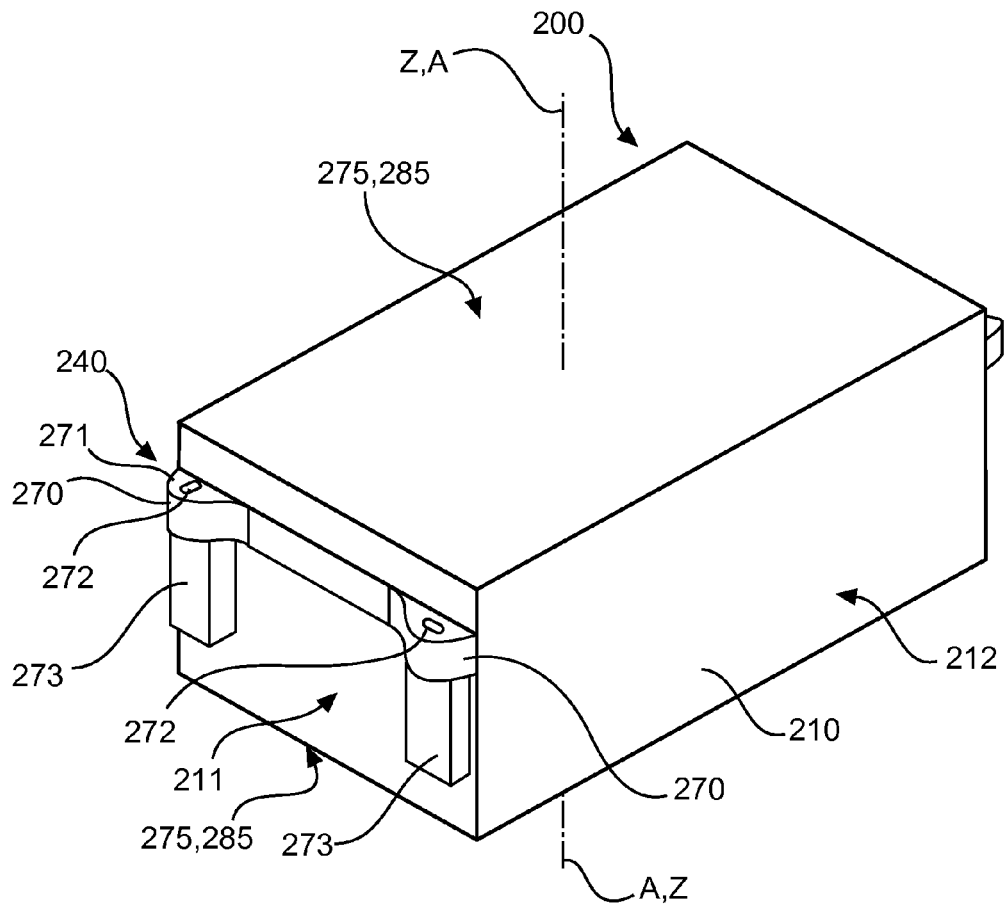
FIG. 1 shows an air filter element according to an exemplary embodiment of the invention.

FIG. 1 shows an air filter element 200 according to an exemplary embodiment of the invention. The air filter element 200 comprises an intake surface 275 and a discharge surface 285. The intake surface 275 can be both on the side pointing upward in FIG. 1, as well as the on the side pointing downward that is not visible. In particular, the filter element 200 can be permeated in both directions so that the intake side 275 and the discharge side 285 can also be interchanged. The filter element 200 has a longitudinal axis A, which can be defined by the direction of flow and which extends between the intake surface 275 and the discharge surface 285. It is understood that the filter element 200 can also be offset so that the longitudinal axis is disposed so that it can be inclined to the direction of flow. In particular, the longitudinal axis can also be curved, when for instance the intake surface and the discharge surface are not parallel to each other and/or the flow of the filter element 200 does not take place along a straight line but along an arched curve. In addition, the air filter element 200 comprises a central axis Z. This central axis Z marks the center point or a certain axis of symmetry. Said axis of symmetry can also be different for the intake surface and the discharge surface. Said axis of symmetry does not absolutely have to coincide with the axis of the longitudinal extension A and also must not be parallel to this axis. The air filter element 200 comprises a filter medium 210 located between the intake surface 275 and the discharge surface 285. This filter medium can consist for example of a paper or a plastic or a fleece or any other desired filter material. The filter medium can be fabricated in various ways. For example, the filter medium can be a pleated paper filter bellows or even be a fluted filter medium layered and adhered together from rippled and flat plies.

The filter element 200 further comprises a filter element-retaining device 240, which is used to fix the filter element 200 in the filter housing 105. The filter element-retaining device 240 can be fastened for example segmentally on an outer lateral surface of the filter medium. Alternatively, filter element-retaining device can also be a circumferential frame, collar or strip around the filter medium 210. The circumferential filter element-retaining device 240 is expedient in particular when a circumferential sealing compound is supposed to be provided on the filter element-retaining device 240. To retain the filter element 200 in a filter housing, the filter element-retaining device 240 comprises a retaining arrangement 270, wherein the retaining arrangement 270 has retaining surfaces 271, which are able to absorb corresponding retention forces acting on the filter element 200. These retention forces can be transmitted via the retaining surfaces 271 to the filter housing. The retaining arrangement 270 further comprises one or a plurality of recesses 272, which are able to receive a corresponding housing-side projection in order to for example fix the filter element 200 in the housing in a precise position in this way. Said recess 272 can be situated for example on the retaining surface 271. The recess can be designed to be cylindrical or conical. It can be designed to be circular, elliptical, oval or rectangular. The retaining arrangement can be designed in the form of convexities, which permit it to rest on corresponding projections in a housing or recesses in a housing. The convexities can thereby extend substantially only over one of the lateral surfaces. In particular, if the convexities are disposed at the corners of the filter element 200, as in FIG. 1, they can be designed so that they do not project over the lateral surface of the filter element 200 that is long here. The convexity does not absolutely have to be disposed at the corner, but can also be disposed in the center of a lateral surface of the filter element 200. If a plurality [of] convexities 243 is provided, they can for example project only over the narrow front side 211 of the filter element 200, but not over the wide sides 212. Naturally, the convexities can also project only over the long sides 212, but not over the short sides 211. This reduces the construction dimensions of either the width or the length of the filter element 200. The retaining device can furthermore comprise spacers 273, which extend in FIG. 1 axially along the filter medium 210. These spacers 273 can ensure a corresponding distance of the filter element 200 in the filter housing 105 to a filter housing wall so that the filter element 200 for example is easy to remove and has a defined contact and bearing surface with respect to the filter housing. Furthermore, mechanical stress can be absorbed more easily such as impacts or vibrations for instance. The recesses 272 in this case can have different embodiments, as explained in the following making reference to FIGS. 2 to 4.

Figure 2:
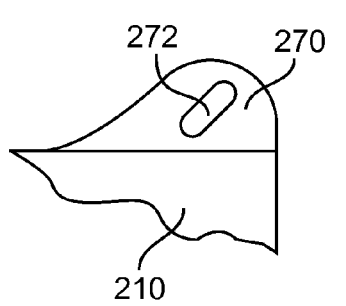
FIGS. 2 to 4 show a detail of a recess according to an exemplary embodiment of the invention.
Figure 3:
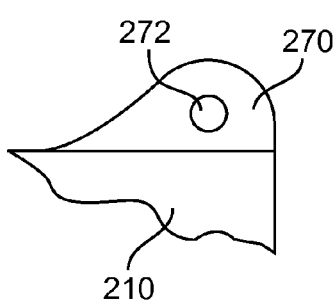
Figure 4:
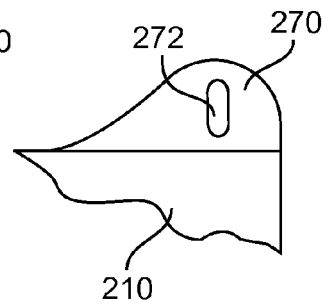

FIG. 2 shows an exemplary embodiment of a retaining arrangement, in which a recess 272 in the shape of an elongated hole can be provided on the filter element-retaining device 240. Said recess in the shape of an elongated hole is disposed in FIG. 2 diagonally to an outer edge of the filter medium 210. Alternatively, the recess 272 can also be designed to be round in filter element-retaining device 240, as can be seen in FIG. 3. Alternatively, the elongated hole can also be disposed parallel to an outer edge of the filter medium 210, as shown in FIG. 4. It is understood that the recess can also have other shapes as alternatives to the embodiments of the recesses depicted in FIGS. 2, 3 and 4, in particular with an angular outer contour or a free-form or even an elongated hole having another alignment than the alignment in FIG. 2 or FIG. 4. The recess 272 can be a recess projecting completely through the retaining arrangement 270. Alternatively, the recess 272 can also be a closed recess, however, which can be designed for example in the form of a blind hole. Said recess can then be provided from the upper side of the retaining arrangement 270, as is shown in FIG. 1. Alternatively, the recess can also be provided from beneath the retaining arrangement 270, which in the case of a blind hole would not be visible in FIG. 1 however, because of the perspective. The recess can be designed to be conical in order to achieve a centering effect. When providing a plurality of recesses, a first recess 272 on a first convexity 243 can be circular. A second recess on a second convexity can comprise an elongated hole, in order to achieve a fixing of the filter element 200, and nevertheless make a slight movement in an elongated hole direction possible, e.g., to compensate for tolerances or thermal expansion. The retaining arrangement here can constitute a convexity, which comprises a substantially continuously curved contour progression, as shown in FIGS. 1 to 4. In this way, a comparative simple seal can be achieved, as will be explained in the following.

Reliably sealing the filter element within an air filter housing in order to separate the clean air side from the raw air side can constitute a particular difficulty especially in the case of filter elements that have small edge radii. Therefore, it is advantageous under some circumstances for a sealing arrangement to have an increased radius. This is particularly important for the fabrication process as well, where a smaller change in the radius, i.e., a smaller curvature, facilitates the dispensing process of sealing material. In general, during a fabrication process it is easier to trace a larger radius than a sharp-edged transition at an edge. This is explained in more detail with reference to FIGS. 5 and 6.

Figure 5:
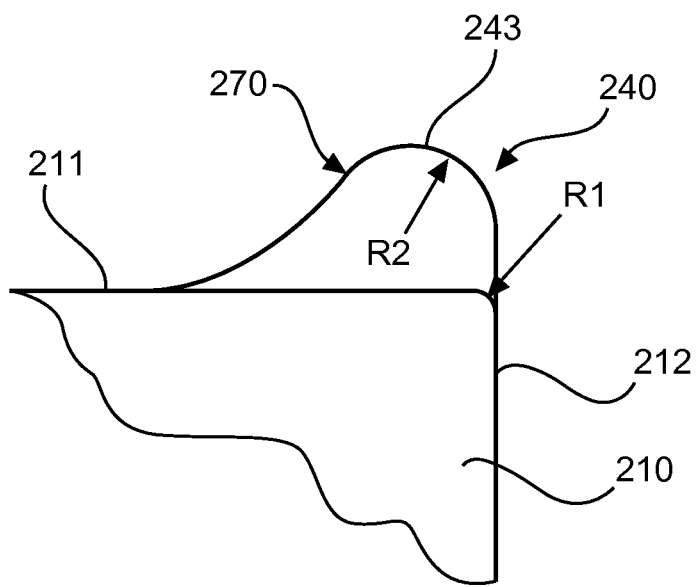
FIG. 5 shows a detail of a retaining geometry according to an exemplary embodiment of the invention.

FIG. 5 shows a detailed view of a retaining arrangement 270, which is depicted in the form of a convexity 243. This convexity extends from the filter medium 210 merely beyond a lateral surface 211 of the filter medium 210. However, the retaining arrangement 270 does not project in FIG. 5 beyond the lateral surface 212. The contour can run for example straight along the lateral edge 212, then follow a radius R2 of approx. 135 degrees counterclockwise, then follow the radius R2 by approx. 45 degrees clockwise in order to then again follow straight along the lateral surface 211. In the process, the convexity does not project over the lateral surface 212.

However, the convexity can also proceed from the straight progression along the lateral surface 212 to begin with following a radius R2 of 225 degree counterclockwise, then the radius of R2 by 45 degrees clockwise in order to then again follow straight on the lateral surface 211. In the case of the latter geometry (FIG. 21), the convexity projects over both the lateral surface 211 as well as the lateral surface 212, and specifically substantially to the same degree. In both of the previous mentioned cases, the radius is not less than R1. Thanks to the convexity 243, the radii of curvature that run through the sealing line 261 in the corner region are larger than the case in which the sealing line 261 runs in the corner region in the direct proximity of the filter medium 210.

In order to apply a sealing compound in the case of the arrangement shown in FIG. 5, a dispensing machine can now trace the contour of the filter element 200 itself, wherein when reaching an end of the lateral surface 212, a smaller radius R1 must be traced in order to subsequently apply a sealing compound along the lateral surface 211. This sudden directional change produces inaccuracies in dispensing and harbors the risk of over- or under-dispensing the sealing compound. However, the convexity 243 makes it possible for a dispensing machine to trace a larger radius R2, which has a smaller gradient than the sharp-edged radius R1. In FIG. 5, the dispensing machine can now follow the contour of the retaining arrangement 270 beyond the end of the lateral edge 212 in order to merely have to trace curves with a larger radius R2 so as to then reach the end of the retaining arrangement 270 on the lateral surface 211. FIG. 5 shows a retaining arrangement 270 or filter element-retaining device 240, which is applied merely to a partial section of the filter medium 210. With such a geometry of the retaining arrangement, it is possible, if desired, for the sealing compound to be molded directly onto the filter medium 210 outside the partial section, and specifically on the lateral surface 212 up to the end thereof, then following the convexity and subsequently to the lateral surface 211. However, the filter element-retaining device 240 can also comprise a surrounding collar on which the sealing compound can be placed. The filter element-retaining device 240 can in turn be tightly adhered with the filter medium 210.

Figure 6:
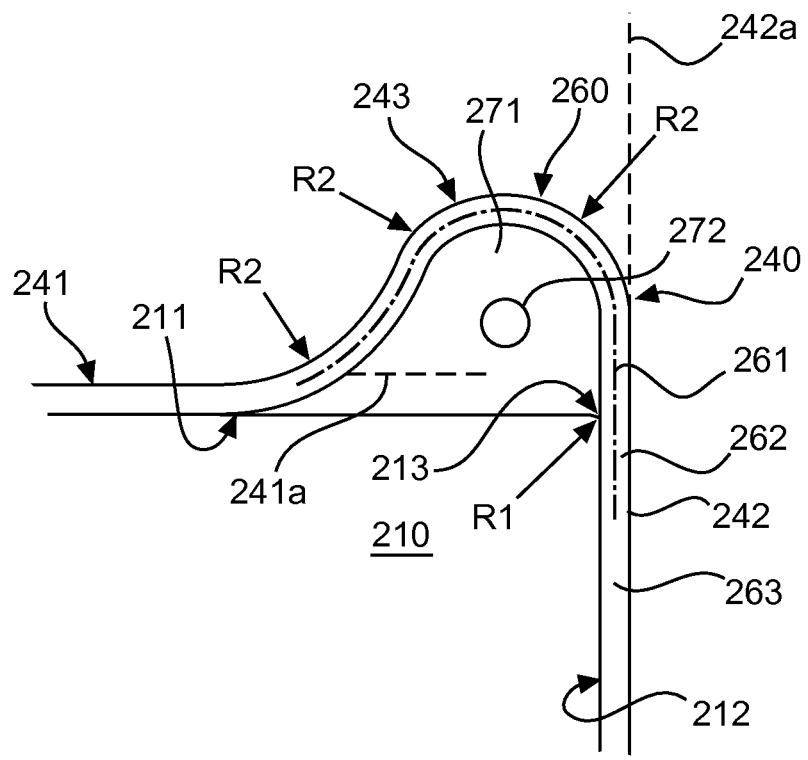
FIG. 6 a sealing arrangement on a retaining geometry according to an exemplary embodiment of the invention.

FIG. 6 shows an exemplary embodiment of the invention, in which a sealing compound 263 is applied to a filter element-retaining arrangement 240. In this case, the filter element-retaining arrangement can project over the filter medium 210 and constitute a type of collar on which the sealing compound 263 can be applied. However, the representation depicted in FIG. 6 can also be viewed as a representation of a surrounding filter element-retaining arrangement 240, on which a sealing compound must still be applied, wherein the dot-dash line represents a sealing line 261 in both cases. The bearing surface of the filter element-retaining arrangement 240 constitutes a sealing surface here, on which an elastic sealing material 263 can be applied. FIG. 6 also shows that the radius of the sealing compound R2 is substantially larger than the radius R1 of the filter medium 210 so that a corresponding dispensing machine is able to trace the sealing line 261 at a considerably quicker speed than a sharp edge 213 of the filter medium 210. The convexity 243 in the embodiment shown in FIG. 6 projects substantially only over the lateral surface 211 of the filter medium 210, but substantially not over the lateral surface 212. The convexity 243 extends here in an angular sector, which is formed by the outer edge 241 of the filter element-retaining device 240 (identified in FIG. 6 with a dot-dash line 241a), which continues in the direction of edge 213, and a continuation of the second outer edge 242 (identified in FIG. 6 with a dot-dash line 242a). In this way, the entire width between the outer edge 242 of the filter element-retaining device and the opposite side of the filter element-retaining device (not shown) can be kept small, thereby reducing the overall installation dimensions of the filter element. Therefore, the function of the convexity 243 is keeping the radius of a sealing compound R2 large to facilitate a quick fabrication process.

Furthermore, the convexity 243 also has the additional function of making a suitable location available for a recess 272. Because this surface 271 is available anyway, a further additional surface no longer has to be provided in order to make a retaining surface or a recess available in addition to providing the seal with a large radius. Therefore, the ear-shaped convexity 243 comprises the combined function of providing both a retaining surface 271 or a surface for a recess 272 and an optimized surface for a sealing arrangement 260. The recess 272 can be designed here as a blind hole. The effect of this is that the recess does not constitute a small air passage between the clean air side and the raw air side, particularly if the recess is situated between the sealing line 261 and the filter medium 210.

Figure 7:
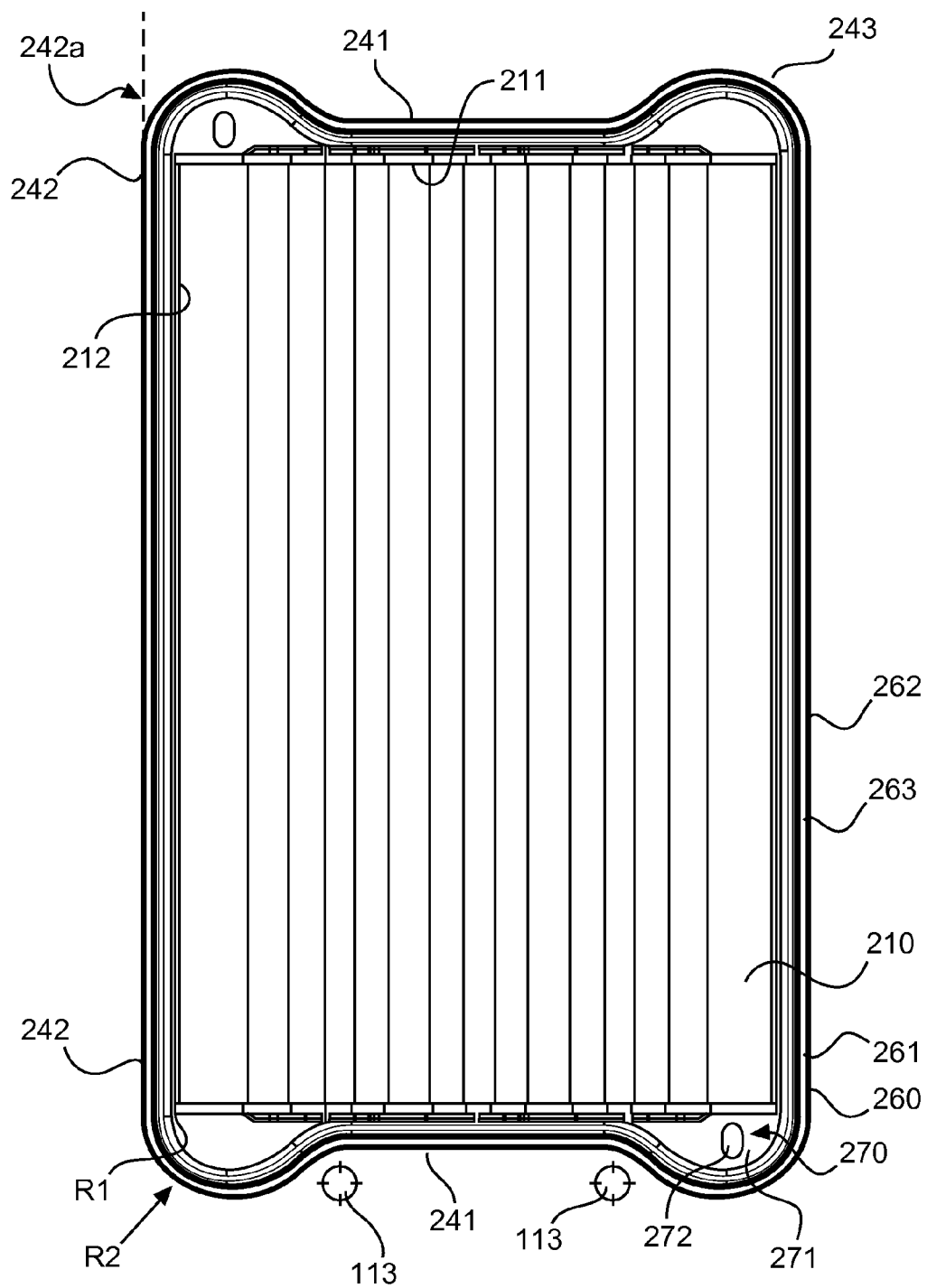
FIG. 7 shows a top view of a filter element according to an exemplary embodiment of the invention.

Making reference to FIG. 7, the top view of a filter element 200 according to the invention is now shown. The filter element 200 shown in FIG. 7 comprises convexities 243 on each of its four corners. Analogous to the geometry in FIG. 6, these convexities 243 also serve here both to receive a sealing arrangement 260 with an increased radius R2 and to provide a retaining surface 271. As a result, if needed, a recess 272 can also be provided on the retaining surface 271 or a recess in the retaining arrangement 270. Because the convexities 243 do not go beyond the outer edge 242 or its continuation 242a of the filter element-retaining device 240, the entire width of the filter element is kept small. In particular, the convexities 243 extend only in an angle that is formed between the outer edge 241 and the straight continuation 241a thereof, on the one hand, and the continuation 242a of the outer edge 242, on the other.

The progression of the sealing line 261 will be explained in detail in the following based on FIG. 7. Proceeding from the left center side of the air filter element 200 in FIG. 7, the sealing line 261 follows first clockwise in the circumferential direction of the air filter element 200 in a straight section of the filter medium lateral surface 212. At approximately the height of the edge between the filter medium lateral surfaces 212 and 211, the straight section merges directly into a section curved radially toward the filter medium 210 (in FIG. 7 curved to the right or curved clockwise). In this section, the sealing line 261 comprises at least almost a constant radius of curvature, e.g., in a range of approx. 20 to 40 mm, preferably in a range of 25 to 35 mm. This is therefore a section shaped like a segment of a circle. The sealing line 210 follows the circular segment-shaped section by approx. 135°. Now directly following is a section curved radially away from the filter medium 210 (in FIG. 7 curved to the left or curved counterclockwise), the radius of curvature of which is likewise almost constant and approximately the same size as, preferably somewhat smaller than, the radius of curvature of the preceding section. This curved away section extends over approx. 45°. Next, a straight section follows along the filter medium lateral surface 211, which [merges into] another curved away section, which substantially comprises the same radius of curvature (e.g., 20 to 40 mm) and the same angular dimension (e.g., approx.) 135° as the first cited section that is curved away. Finally, this is followed by a section curved toward the filter medium 210, which again comprises substantially the same radius of curvature and the same angular dimension as the first cited section that is curved toward [the filter medium]. At the height of the edge between the filter medium lateral surface 211 and the other filter medium lateral surface 212, the curved-toward section merges into a long straight section along the filter medium lateral surface 212. This is now followed again by sections that are curved toward and curved away [from the filter medium] etc.

Overall, a section curved toward the filter medium 210 and a section curved away from the filter medium 210 are provided in in each of the four corner regions of the air filter element 200 to form a respective convexity 243. In the case of the example shown in FIG. 7, all curved-away sections comprise the same radius of curvature and the same angular dimension among each other. All sections curved toward the filter medium 210 also comprise the same radius of curvature and same angular dimension among each other.

As indicated in FIG. 7, a recess 272 can be provided in the retaining surfaces 271. This recess is depicted as an elongated hole in FIG. 7. Analogous to the explanations of FIGS. 2 to 4, said elongated hole can however also have a different alignment. Alternatively, the recess can also comprise any other desired shape. In particular, the recess can be designed as a through hole. However, the recess 272 can also be designed as a blind hole or as a closed recess. This recess allows, for example, a housing-side projection to be received in order to properly position the air filter element 200 in an air filter housing. Particularly in the case of air filter elements that do not evidently have a preferred installation orientation, a corresponding housing-side projection or a recess on the air filter element can ensure that the air filter element is inserted into the air filter housing in a proper orientation. The sealing surface 262 or the sealing line 261 can be guided in a progression along the long sides 212 of the filter element 200 and after running around the convexity 243 again along the narrow side 211 of the filter element 200. As a result, the filter element 200 can comprise a smaller installation dimension between the corresponding convexities 243 so that for example housing-side devices 113, such as for example struts or screw joints, can be disposed in this region without having to provide space projecting over the filter element 200 or the convexities 243 thereof. For this purpose, the radius of the convexity can, after passing through a 90-degree segment of a circle, for example pass through a further 45-degree segment of a circle along the same curvature in order to then pass through an opposite curvature of again a segment of a circle of 45 degrees, to then again obtain an alignment running parallel to the outer edge 211. The radius R2 can be substantially retained in the process, only the curvature changes when passing through the periphery phase-by-phase from a right curvature to a left curvature or vice versa.

Figure 8:
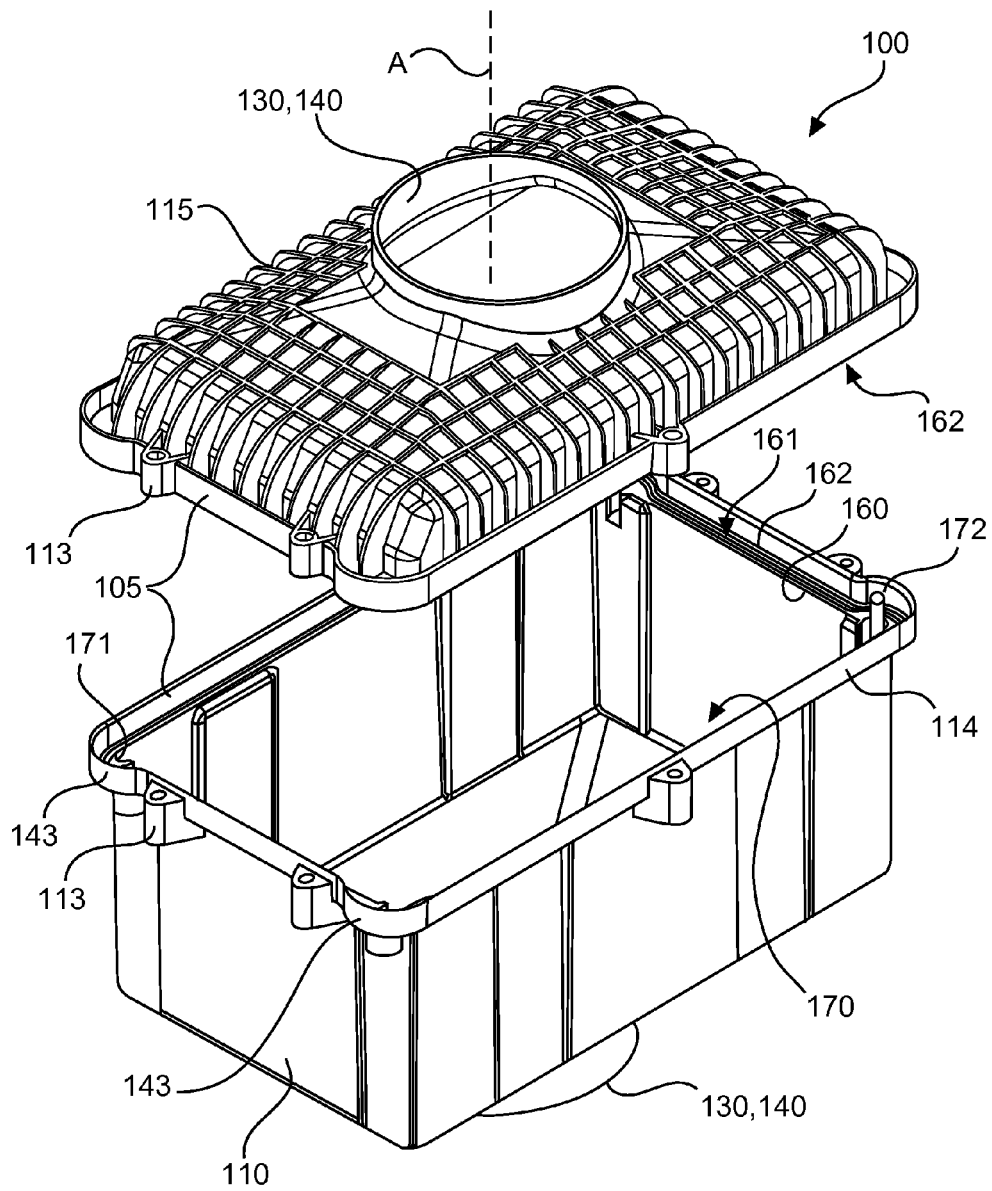
FIG. 8 shows an air filter housing for the insertion of a filter element according to the invention.

FIG. 8 shows an exemplary embodiment of an air filter housing for insertion of an air filter element according to the invention. The air filter housing 105 of an air filter 100 depicted in FIG. 8 comprises a housing body 110 and a housing cover 115. An air inlet 130 or air outlet 140 is situated in the housing cover 115 in the embodiment shown in FIG. 8. This opening depicted in FIG. 8 can be used here as both an air inlet and alternatively as an air outlet. Similarly, there is an opening in the housing body 110, which is not completely visible here, which likewise can be used as an air inlet 130 as well as an air outlet 140.

In the embodiment shown here, the housing cover 115 comprises an arrangement of reinforcing ribs. The housing body 110 comprises a collar 114. Said collar comprises a contour corresponding to the outer contour of the air filter element 200. This makes it possible for example to install the filter element-retaining device 240 with the contour having its four convexities 243 (see FIG. 7) within the collar 114. In the process, the sealing compound 263 can be applied both on the upper side of the filter element-retaining device as well as to the lower side. Accordingly, the corresponding counter sealing surface 162 of the housing-side sealing arrangement 160 is located on the housing either on the housing body 110 or on the housing cover 115. The sealing line 161 is designed as a circumferential sealing line. Due to the convexities 143, the sealing line 161 on the housing does not run with an exclusively positive curvature, i.e., convex as seen from the outside, but also comprises, along with the straight sections, concave sections, in particular on the narrow sides. Corresponding screw fastenings 113 for example can be disposed in a space saving manner in the hollows of the concave sealing line 161. Corresponding projections 172 can be provided in the housing, which can project into the corresponding recesses 272 of the filter element 200. A filter element receptacle 170 is provided in the housing, which can receive a corresponding retaining arrangement 270 of the filter element 200. The projections 172 can be provided on this filter element receptacle 170. Due to the appropriate design of the recesses 272 as elongated holes, a certain tolerance can be achieved in positioning. Due to the appropriate design of the projections 172 on the housing or of the recesses 272, it is also possible to ensure that the filter element 200 can only be introduced into the housing in a predetermined position. As FIG. 8 shows, corresponding housing-side devices 113, such as screw joints for example, can be provided in the correspondingly freed-up regions, which are between the convexities 243 of the filter element 200 or between the convexities 143 of the housing. In this way, the overall dimensions of the housing are not increased, although the housing-side devices 113 project over the corresponding edge of the housing. Moreover, the retaining surfaces 271 can rest on corresponding bearing surfaces 171 in the housing so that a proper axial positioning of the filter element 200 can be achieved. Appropriately designed bearing surfaces furthermore make it possible that the sealing compound 263 is only compressed up to a specific maximum degree so as not to be crushed by the screw joint on the housing cover.

Figure 9:
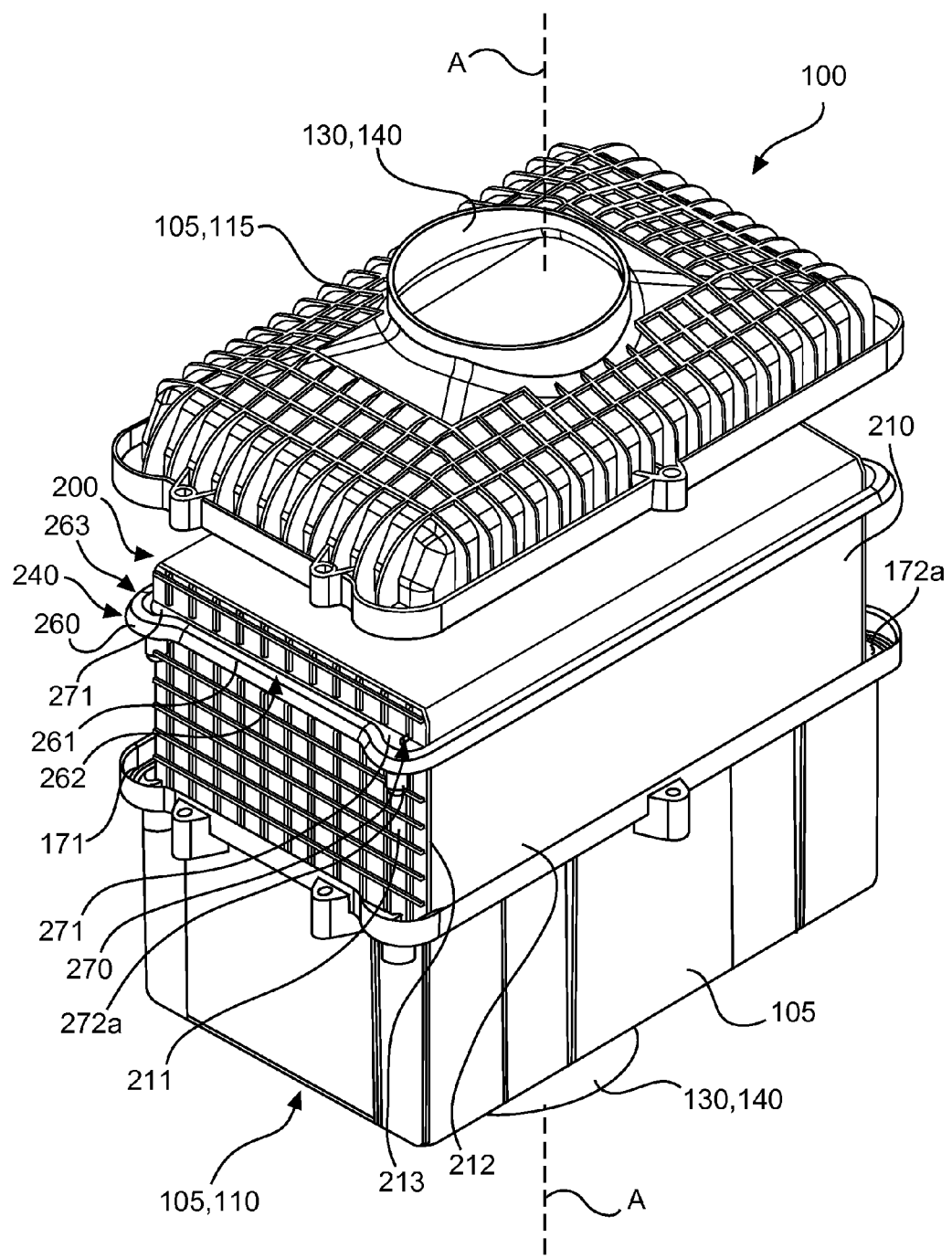
FIG. 9 shows a filter inserted into an air filter housing according to an exemplary embodiment of the invention.

FIG. 9 shows an arrangement, in which the filter element 200 is being inserted into the air filter housing 105 so as to form an air filter 100 together with the air filter housing 105. As an alternative, FIG. 9 shows that, instead of corresponding recesses 272, corresponding projections 272a can also be provided, which can engage in the corresponding recesses 172a in the housing. Thus, for example, by using a combination of corresponding projections and recesses on a filter element 200 and appropriately corresponding projections and recesses on the air filter housing, it is possible to ensure that only the filter elements 200 matching the air filter housing can be inserted. The projections and recesses can be designed in particular in such a way that an incorrectly fitting air filter element 200 will project over the sealing geometry of the air filter housing so that the cover 115 of the air filter housing can no longer be closed.

The lateral surfaces 211 or 212 can furthermore be provided with a reinforcement, such as the ribbed structure shown on the filter element 200 in FIG. 9. In particular, the convexity 243 of the filter element-retaining device 240 can be disposed on the side of the filter element 200, which is strengthened by a corresponding reinforcement structure. In this way, the appropriate retention force can be applied to the filter element 200 or the filter medium 210 in particular via the already reinforced side 211 of the filter element 200. The seal can be applied in the process to both a collar of the filter element-retaining device 240, but also to an outer edge of the filter element-retaining device 240. In particular, an edge of the filter element-retaining device can be overmolded with a sealing compound, in particular an elastic sealing compound, such that the sealing compound surrounds the edge as impact protection. The sealing compound can be applied along the long sides 212 of the filter medium 210 also directly on the filter medium. Additional retaining geometries are not absolutely required there in order to receive the sealing compound. The sealing compound can comprise different cross sections. In particular, the cross section of the sealing compound can be rectangular, semicircular, trapezoidal or be in the shape of half an ellipse or half an oval. However, the shape of the cross section of the sealing compound is not restricted to the cross sectional shapes mentioned.

Figure 10:
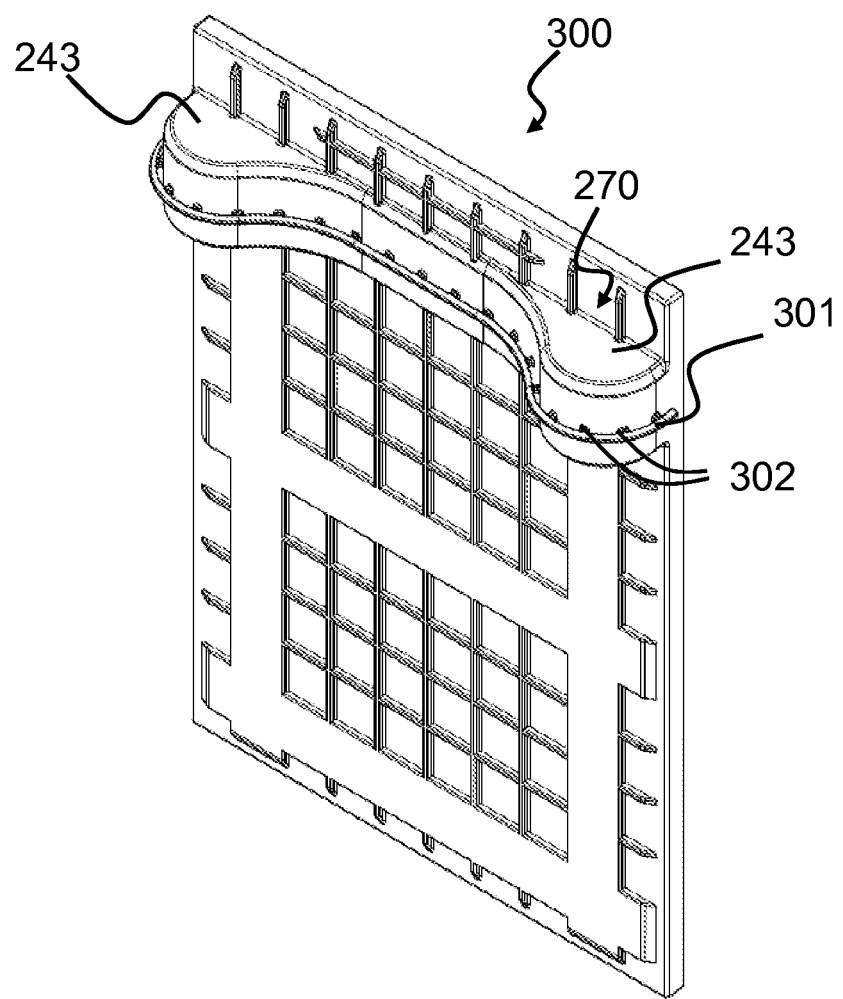
FIG. 10 shows an end plate of a filter element according to an exemplary embodiment of the invention.

FIG. 10 shows a reinforcing structure in the form of an end plate 300 of another example of an air filter element 200 of an air filter 100. The air filter 100 is largely identical to the air filter 100 described on the basis of FIGS. 7 to 9. The same or similar components have been provided with the same reference numbers.

A respective end plate 300, as shown in FIG. 10, is fastened on both filter medium lateral surfaces 211 of the filter element 200, for example by adhering or welding the end plates 300 to the filter medium 210. No reinforcing structure is provided on both of the other filter medium lateral surfaces 212. In the case of a zig-zag-shaped pleated filter medium 210, the end plates 300 also serve to laterally seal the pleat pockets. The individual end plate 300 is preferably produced from (hard) plastic, in particular as an injection molded part.

As part of the filter element-retaining device 240, the retaining arrangement 270 is provided with two convexities 243 on the end plate 300. The sealing arrangement 260 is still missing on the end plate 300 in accordance with FIG. 10. To form the sealing arrangement 260, the sealing compound 263 is formed on the end plate 300 in such a way that the sealing compound 263 surrounds a fastening bar 301. The fastening bar 301 is connected to the outer surface of the end plate 300 via a plurality of holding bars 302. The hold produces an especially solid connection of the sealing compound 263 on the end plate 300. In particular, the sealing compound 263 is cast or foamed onto the end plate 300. A PUR material is preferably used as the sealing compound 263. In particular, the end plate 300 comprises a hard plastic and a soft plastic as the sealing compound 263. However, it is also conceivable for the entire end plate 300 to be cast or foamed on composed of as a single material with or without the sealing compound 263, e.g., from a PUR material.

FIGS. 11 to 13 show portions of the air filter element 200 with the end plate 300 from FIG. 10, wherein the sealing compound 263 has already been formed on in FIGS. 11 to 13. The sealing compound 263 forms a sealing arrangement 260, which comprises a circumferential sealing surface 303 running perpendicular to the longitudinal axis Z of the air filter element 200 (FIG. 11). A respective holding surface 271, facing upward in FIG. 11, is provided at the convexities 243. The retaining surfaces 271 are disposed set axially forward with respect to the sealing surface 303. When foaming the sealing material 263, the axial offset prevents any inadvertent slight over-dispensing of the sealing compound 263 from being able to reach the retaining surface 271.

A second circumferential sealing surface 304 or sealing bead (FIG. 12) is provided on the opposite side of the sealing arrangement 260. A respective retaining surface 271, facing downward in FIG. 12, is provided at the convexities 243. These retaining surfaces 271 are axially set back slightly with respect to the sealing surface 304. FIG. 13 shows a view directly on one of these retaining surfaces 271. In addition to a recess 272 for receiving a housing-side projection, it comprises yet additional recesses, the purpose of which is merely to save plastic material.

Figure 14:
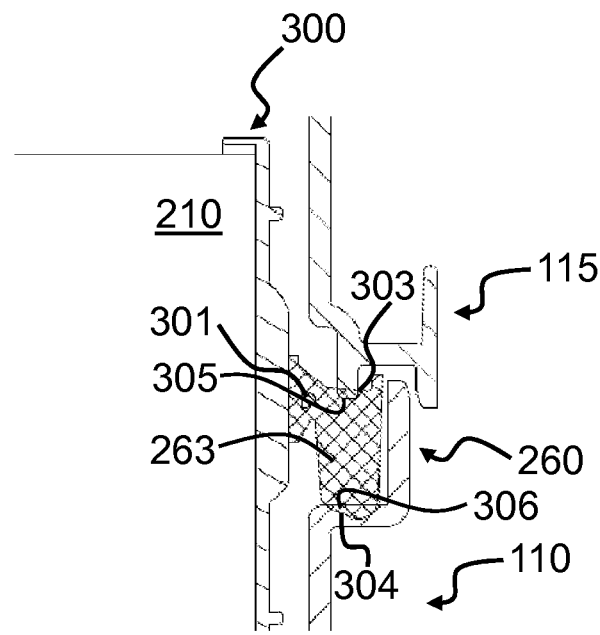
FIG. 14 shows an sectional view of a filter element inserted into an air filter according to an exemplary embodiment of the invention.

FIG. 14 is an extracted sectional view of the filter element 100 inserted into the filter housing 100 in the region of the end plate center 300. A housing-side sealing surface 305, which is configured in a surrounding sealing bar of the housing cover 115, is pressed axially on the element-side sealing surface 303. A housing-side sealing surface 306, which is configured on a surrounding step of the housing body 110, is pressed in the opposite axial direction on the element-side sealing surface 304. This is an axial sealing geometry. FIG. 14 shows the sealing compound 263 in an unpressed-in or undeformed state. Actually, the sealing compound 263 does not overlap with the housing-side components, but is deformed in such a way that it rests tightly against said components. In addition, FIG. 15 shows how the sealing compound 263 surrounds the fastening bar 301.

The housing cover 115 and the housing body 110 are each provided with housing-side retaining surfaces 171 (not shown in FIG. 14), which, in an installed state of the filter element 200, rest against the element-side retaining surfaces 271 (on the upper side and lower side of the convexities 243). This produces a firm mount of the filter element 200 in the filter housing 100 via the convexities 243 at least in both axial directions. The housing-side sealing surface 306 and the housing-side retaining surfaces 171 of the housing body 110, which face in the same direction (upwards), preferably run at the same axial height. Fabrication-related tolerance errors of the axial relative position of theses surface are avoided.

Figure 15:
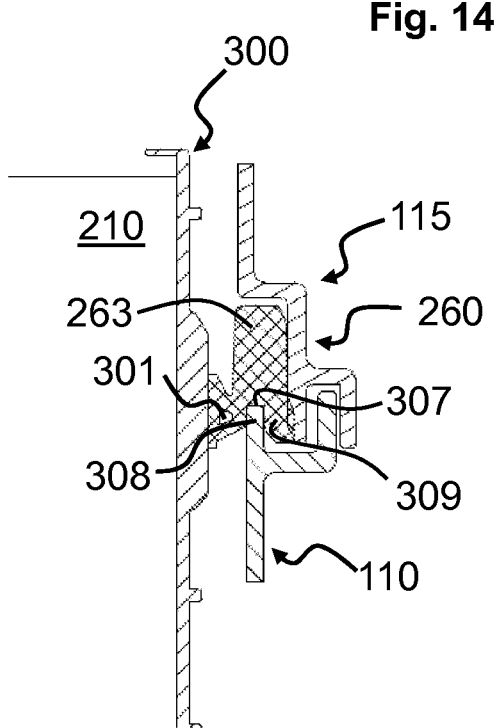
FIG. 15 shows an extracted sectional view of a filter element inserted into an air filter according to an exemplary embodiment of the invention.

FIG. 15 shows a sectional view corresponding to FIG. 14 of another example of an air filter 100 of an air filter element 200 with a somewhat modified sealing geometry. Incidentally, the air filter 100 corresponds to the examples described in the foregoing. The sealing compound 263 surrounding the fastening bar 301 comprises a modified shape. It comprises a circumferential groove. A housing-side sealing bar 308 engages in this groove 307 in an installed state. The groove 307 and sealing bar 308 are dimensioned in such a way that the outer surface of the outer groove wall 309 is pressed radially outwardly on a housing inner wall. A radial seal is yielded. In addition, the sealing compound 263 can also rest axially against a housing surface on the side opposite from the groove 307 in order to stabilize the seal or even to achieve an additional axial seal.

Figure 16:
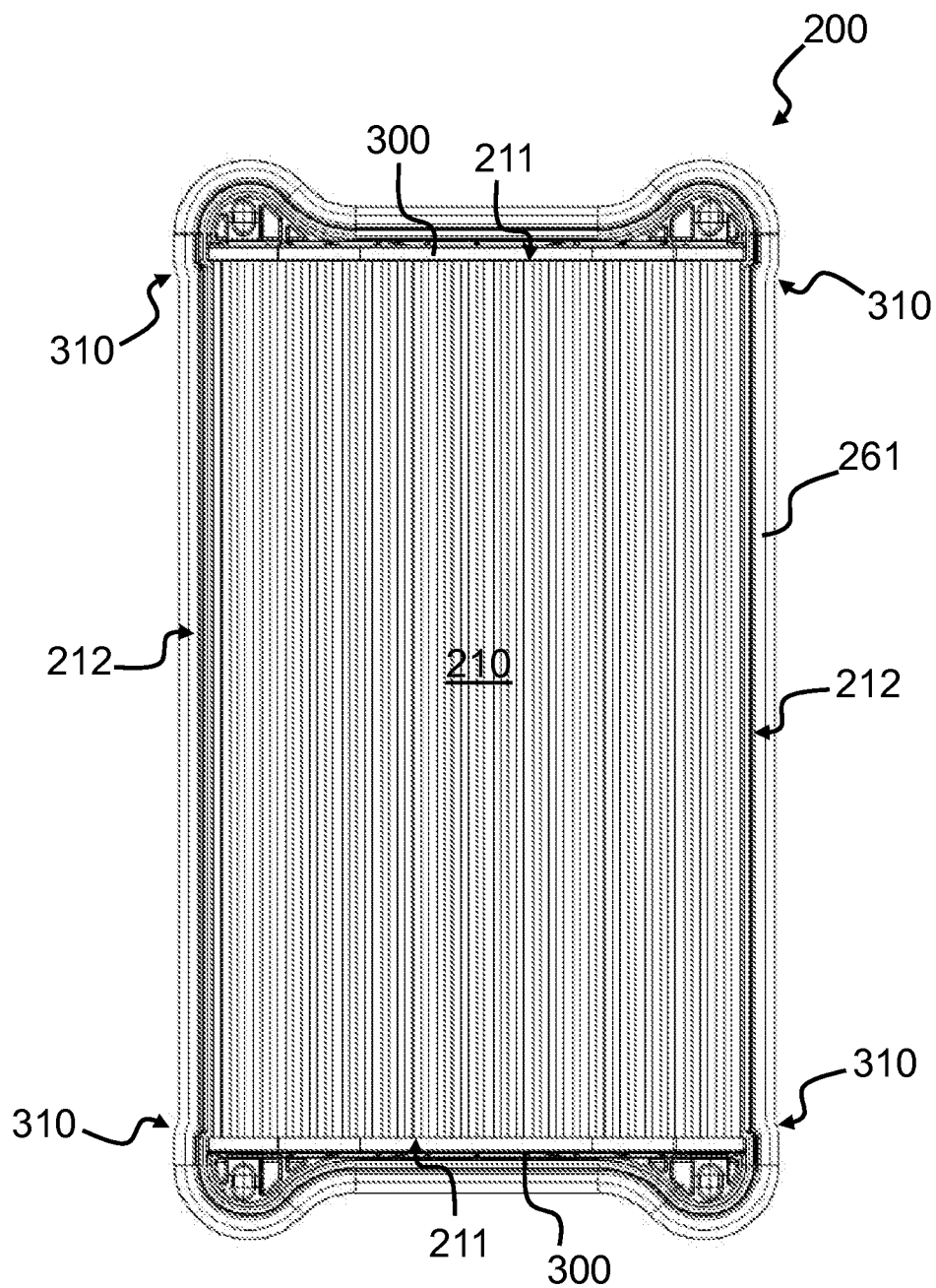
FIG. 16 shows a top view of a filter element according to an exemplary embodiment of the invention.

FIG. 16 shows a top view of a further example of an air filter element 100. The filter element 200 can be configured to be largely identical to the previously described filter elements 200. It comprises two end plates 300, which are connected to the filter medium lateral surfaces 211. It shows for example that the sealing line 261 passes respectively through an offset 310 when transitioning from a filter medium lateral surface 212 to the narrow outer edge surface of the end plate 300. To guarantee a functionally secure fastening of the filter medium 210 to the end plates 300, they must project laterally somewhat with respect to the filter medium 210. Thanks to the offsets 310, the filter element 200 is still able to be configured somewhat smaller structurally, despite the laterally projecting end plates 300, with the same volume being available for the filter medium.

Figure 17:
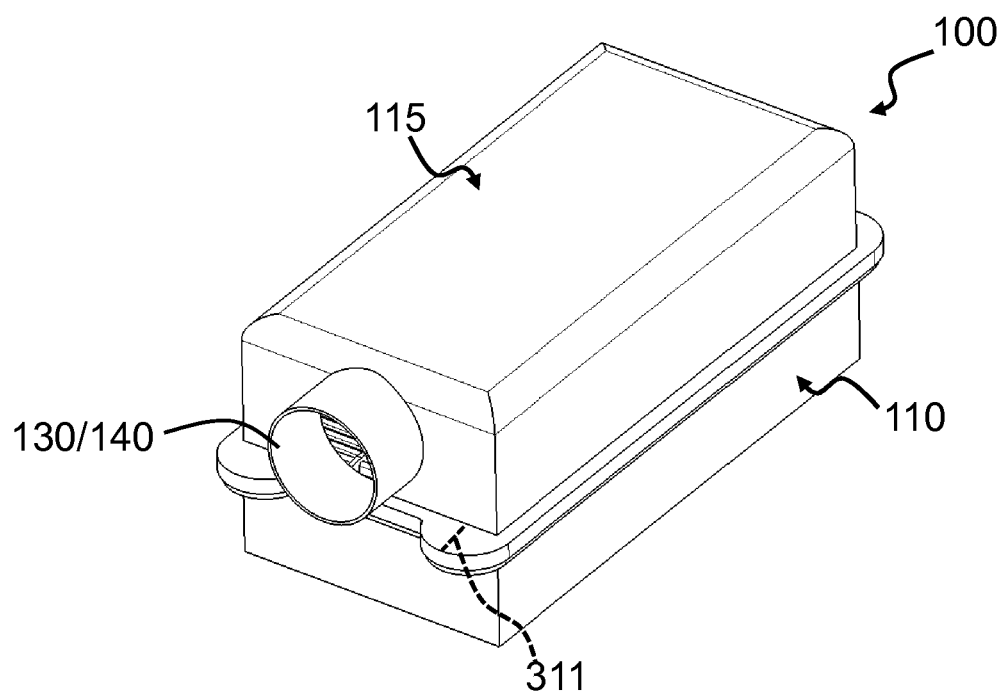
FIG. 17 shows a filter element inserted into an air filter housing according to an exemplary embodiment of the invention.
Figure 18:
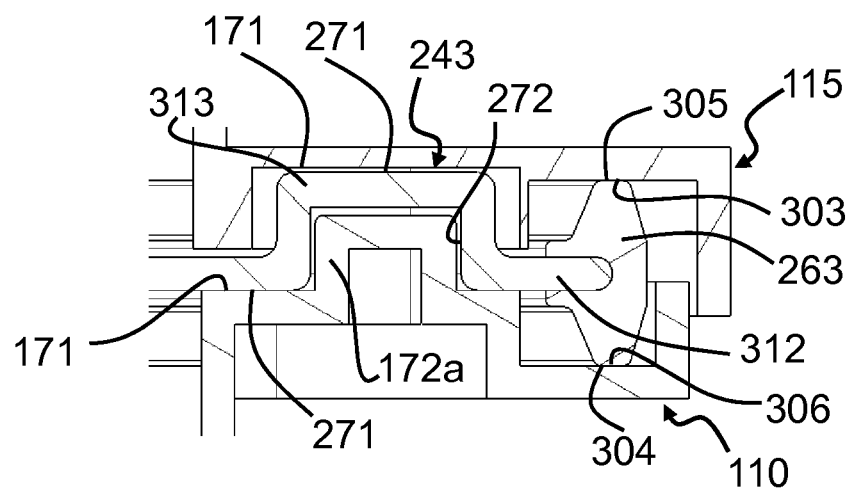
FIG. 18 shows an extracted sectional view of a filter element inserted into an air filter according to an exemplary embodiment of the invention.
Figure 19:
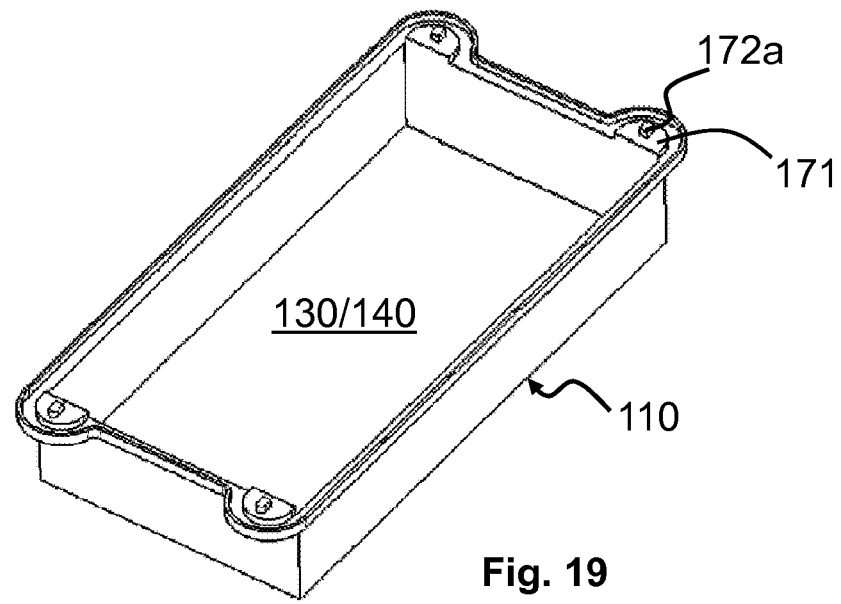
FIG. 19 shows a lower housing part of an air filter housing according to an exemplary embodiment of the invention.

Another example of an air filter 100 is described on the basis of FIGS. 17 to 20. FIG. 17 shows the air filter in an operationally ready state. The filter housing 105 comprises a removable housing cover 115 and a housing body 110. The housing cover is provided with a lateral discharge opening 130 or intake opening 140. The housing body 110 accordingly comprises an intake opening 140 or discharge opening 130 (FIG. 19).

FIG. 18 is an extracted sectional view along the plane indicated in FIG. 17 by means of the broken line 311. The sealing compound 263 is formed on a surrounding rim 312 of the filter element 200. The surrounding sealing surfaces 303 and 304 of the sealing compound 263 rest sealingly against surrounding housing-side sealing surfaces 305 and 306. The rim 312 forms the convexities 243. The retaining surfaces 271, facing downward in FIG. 18, on the convexities 243 rest against corresponding retaining surfaces 171 on the housing body 110. The retaining surfaces 271, facing upward in FIG. 18, have a slight distance from the corresponding housing-side retaining surface 171. However, they can also be designed such that they likewise make contact. A recess 272 is formed on the underside of the convexities 243 by a hollow projection 313, in which recess a housing-side projection 172a engages. To save material, the projection 172a is likewise hollow.

Figure 20:
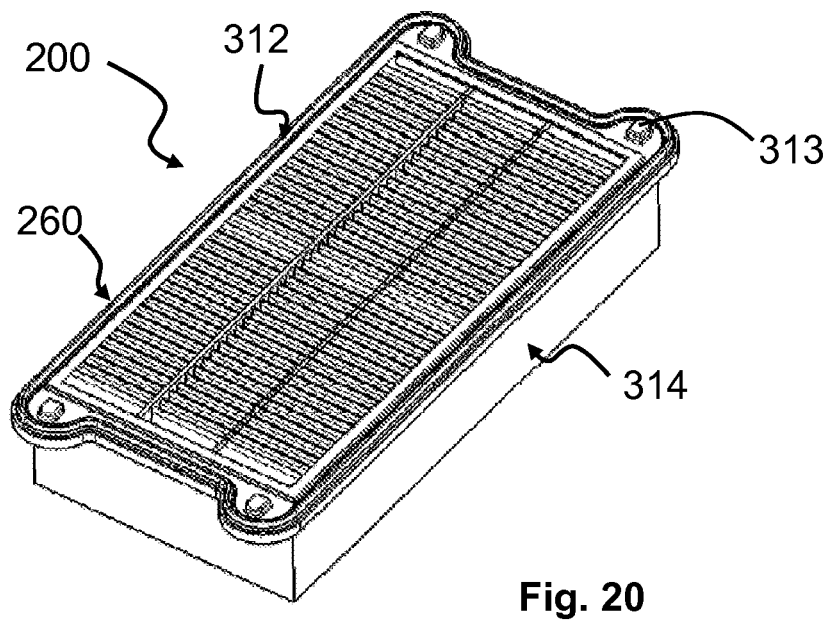
FIG. 20 shows a filter element according to an exemplary embodiment of the invention.

FIG. 20 shows the filter element 200 with the surrounding rim 312, which is provided with the surrounding sealing arrangement 260, the convexities 243 and the hollow projections 313. For example, the filter element 200 also represents a variation of a filter element 200 that comprises a surrounding frame 314. The surrounding rim 312 is part of the frame 314. However, it also serves to laterally seal and stabilize the filter medium 210. The circumferential frame is preferably of plastic and injected on the filter medium 210 by means of an injection molding process. Consequently, this is a plastic overmolded filter element 200. The sealing line 261 of the sealing arrangement 260 runs corresponding to the sealing line 261 of the filter element 200 described based on FIG. 7.

Figure 21:
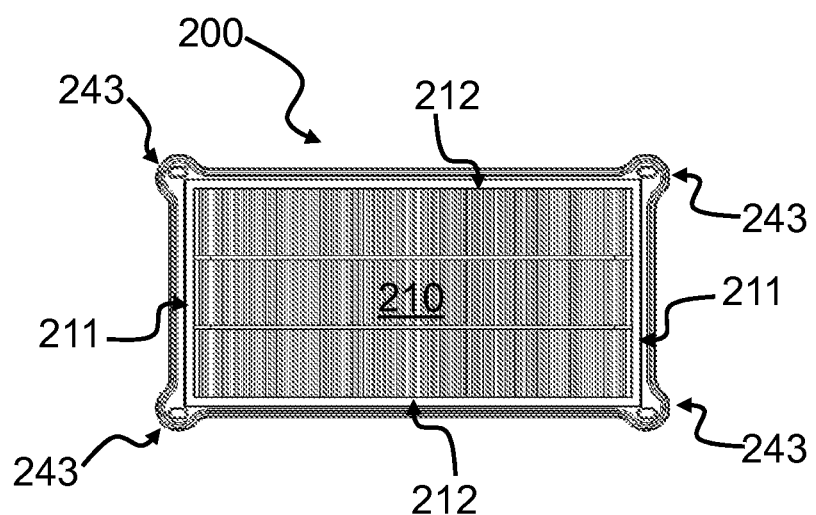
FIG. 21 shows a top view of a filter element according to an exemplary embodiment of the invention.
Figure 22:
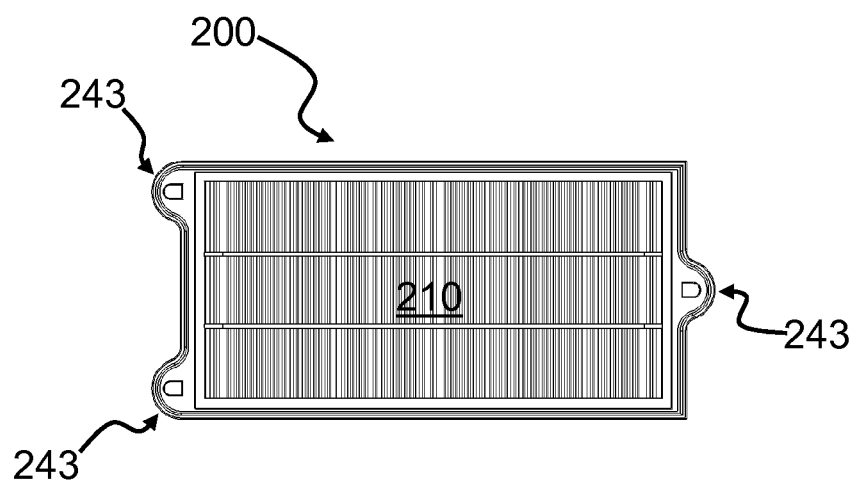
FIG. 22 shows a top view of a filter element according to an exemplary embodiment of the invention.

Two examples of filter elements 200 with a modified progression of the sealing line 261 are depicted in FIGS. 21 and 22. The filter elements 200 shown are also plastic overmolded filter elements 200. However, a corresponding sealing progression can also be realized with filter elements 200 having two opposing end plates 300 or filter elements 200 with a different structure.

In contrast to the previously described elements 200, the convexities 243 in FIG. 21 are not just opposite from one filter medium lateral surface 211, 212, rather they are opposite from both filter medium lateral surfaces 211, 212, in particular by the same degree. In the region of a convexity 243, the sealing line 261 first runs along one of the sections that is curved radially away from the filter medium 210 radial, then along a section that curved radially toward [the filter medium] and finally again along a section that is curved radially away again.

FIG. 22 shows an example of a filter element 200, which is structured non-mirror-symmetrically at least in terms of the configuration of the convexities 243. Thanks to this measure, the filter element 200 can only be installed in the filter housing 105 in a unique predetermined position. In general, a one-to-one installation position of a filter element 200 can be defined by shaping (e.g., radius of curvature, radial overhang etc.) and/or number and/or position of the convexities 243.

In general, it can also be advantageous to manufacture the convexities 243 or the entire retaining arrangement 260 or the entire filter element-retaining device 240 from a polymer foam, in particular a PUR foam.

It should be noted that the present invention can also be used for liquid filters in addition to air filters.

It should be noted that the term "comprehensive" does not rule out other elements or procedural steps, just like the term "a" and "an" does not rule out a plurality of elements and steps.

The reference numbers used serve merely to increase comprehensibility and should in no case be regarded as restrictive, wherein the protective scope of the invention is rendered by the claims.

The invention claimed is:

1. An air filter element for insertion into an air filter housing, wherein the air filter element comprises:
   an intake surface,
   a discharge surface,
   a filter medium, and
   a filter element-retaining device,
   wherein the filter medium extends between the intake surface and the discharge surface in an axial direction of the air filter element,
   wherein the filter medium forms a plurality of connected axially extending lateral sides defining a radially outer periphery of filter medium, adjacent ones of the plurality of lateral sides forming an axially extending corner where axially extending end edges of adjacent ones of the plurality of lateral sides meet,
   wherein the filter element-retaining device is connected to the filter medium,
   wherein the filter element-retaining device extends along at least one section of the periphery of the filter medium between the intake surface and the discharge surface, wherein the filter element-retaining device includes a retaining arrangement that radially projects from the filter medium, wherein the retaining arrangement comprises at least one radially projecting convexity, wherein a first one of the plurality of lateral sides of the filter medium has arranged spaced apart thereon a first one and a second one of the at least one radially projecting convexity, wherein the first one of the at least one radially projecting convexity is arranged on the first one of the plurality of lateral sides adjacent to a first axially extending end edge of the first one of the plurality of lateral sides, wherein the second one of the at least one radially projecting convexity is arranged on the first one of the plurality of lateral sides adjacent to an opposing second axially extending end edge of the first one of the plurality of lateral sides.

2. The air filter element according to claim 1, wherein the retaining arrangement comprises
at least one recess in the axial direction (A),
wherein the recess is designed to receive a projection located on the air filter housing side.

3. The air filter element according to claim 2, wherein the cross section of the recess decreases at least partially in the axial direction (A).

4. The air filter element according to claim 2, wherein at least one of the at least one recess is an elongated hole recess.

5. The air filter element according to claim 1, wherein the retaining arrangement comprises a plurality of recesses in the axial direction (A), which are disposed along the periphery of the filter element-retaining device in such a way that the recesses are distributed over an angle of at least 90 degrees.

6. The air filter element according to claim 1, wherein the retaining arrangement comprises a plurality of recesses in the axial direction (A),
wherein the plurality of recesses related to a central axis (Z) of the air filter element comprises an angular division, which defines a unique installation position of the air filter element in an air filter housing.

7. The air filter element according to claim 6, wherein the filter element-retaining device comprises
a sealing arrangement with a sealing line surrounding the filter medium,
wherein the recesses are disposed at least partially between the surrounding sealing line and the filter medium.

8. The air filter element according to claim 7, wherein the recesses disposed between the surrounding sealing line and the filter medium are closed recesses.

9. The air filter element according to claim 7, wherein the sealing arrangement comprises
an elastic sealing material and
the sealing line rests on the sealing material.

10. The air filter element according to claim 7, wherein the retaining arrangement comprises
a retaining surface, which is designed to transfer retention forces between the air filter element and an air filter housing,
wherein the retaining surface is disposed between the surrounding sealing line and the filter medium.

11. The air filter element according to claim 9, wherein the progression of the sealing line is curved radially away from the filter medium in sections.

12. The air filter element according to claim 1, wherein the retaining arrangement extends in the axial direction (A) along the filter medium over at least a portion of the filter medium,
wherein the portion extending in the axial direction is designed as a spacer from an air filter housing.

13. An air filter housing, which is designed to receive a filter element according to claim 1, wherein the air filter housing comprises:
an intake opening,
a discharge opening,
a filter element receptacle,
wherein the filter element receptacle is situated between the intake opening and the discharge opening,
wherein the air filter housing further includes
a surrounding sealing line,
wherein the progression of the sealing line is curved radially away from a to-be-inserted filter element in sections,
wherein the filter element receptacle comprises
at least one projection in the axial direction (A) of the filter element,
wherein the projection is designed to engage in a recess on the filter element side.

14. An air filter having an air filter element according to claim 1 and an air filter housing according to claim 13, wherein
the air filter element is disposed replaceably in the filter element receptacle of the air filter housing.

* * * * *